United States Patent
Yumoto

(10) Patent No.: US 12,493,164 B2
(45) Date of Patent: Dec. 9, 2025

(54) OPTICAL ELEMENT PART INCLUDING AT LEAST TWO OPTICAL CHARACTERISTIC REGIONS, AND TURRET, OPTICAL ELEMENT DEVICE, AND CAMERA INCLUDING THE SAME

(71) Applicant: ZNONZ CO., LTD., Tokyo (JP)

(72) Inventor: Yoshihide Yumoto, Tokyo (JP)

(73) Assignee: ZNONZ CO., LTD., Tokyo (JP)

( * ) Notice: Subject to any disclaimer, the term of this patent is extended or adjusted under 35 U.S.C. 154(b) by 320 days.

(21) Appl. No.: 18/279,272

(22) PCT Filed: Feb. 21, 2022

(86) PCT No.: PCT/JP2022/006947
§ 371 (c)(1),
(2) Date: Aug. 29, 2023

(87) PCT Pub. No.: WO2022/185968
PCT Pub. Date: Sep. 9, 2022

(65) Prior Publication Data
US 2024/0151933 A1 May 9, 2024

(30) Foreign Application Priority Data
Mar. 1, 2021 (JP) ................................ 2021-032176

(51) Int. Cl.
*G02B 7/16* (2021.01)
*G03B 17/14* (2021.01)

(52) U.S. Cl.
CPC ............... *G02B 7/16* (2013.01); *G03B 17/14* (2013.01)

(58) Field of Classification Search
CPC .................................. G02B 7/16; G03B 17/14
(Continued)

(56) References Cited

U.S. PATENT DOCUMENTS

2002/0030755 A1    3/2002  Uchino
2005/0135798 A1*   6/2005  Szajewski ............. G03B 41/00
                                                      396/335
(Continued)

FOREIGN PATENT DOCUMENTS

JP    S55-82873 U    6/1980
JP    H09-093485 A   4/1997
(Continued)

OTHER PUBLICATIONS

PCT/ISA/210, "International Search Report for PCT International Application No. PCT/JP2022/006947," May 24, 2022.

*Primary Examiner* — Sharrief I Broome
(74) *Attorney, Agent, or Firm* — Kreative IP Management LLC; Fuiyeong Kim

(57) ABSTRACT

A turret-type optical element device includes an attaching part attached to a lensless camera having no optical elements on an optical path, and a turret rotatably attached to a substrate having an optical path opening and including an optical element part having at least two optical characteristic regions in which characteristics in optical characteristics possessed by an optical element are different from each other. The turret is rotated such that each of the optical characteristic regions and the optical path opening are faced each other, the optical element part itself is an integrally formed product that is detachably attached to the turret, the turret-type optical element device is attached to the lensless camera through the attaching part, and constitutes an imaging system that includes no optical elements, other than the optical element part on the turret, on the optical path.

9 Claims, 15 Drawing Sheets

(58) Field of Classification Search
USPC .......................................................... 359/821
See application file for complete search history.

(56) References Cited

U.S. PATENT DOCUMENTS

| | | | | |
|---|---|---|---|---|
| 2009/0066945 | A1* | 3/2009 | Wang | G01M 11/0207 |
| | | | | 356/244 |
| 2010/0259824 | A1 | 10/2010 | Mitsuhashi et al. | |
| 2015/0212394 | A1* | 7/2015 | Ozawa | H04N 23/55 |
| | | | | 359/821 |
| 2016/0330354 | A1* | 11/2016 | Moriyama | G03B 17/566 |

FOREIGN PATENT DOCUMENTS

| | | |
|---|---|---|
| JP | 2000-235211 A | 8/2000 |
| JP | 2002-084451 A | 3/2002 |
| JP | 3483320 B2 | 1/2004 |
| JP | 2011-070150 A | 4/2011 |
| JP | 2016-095451 A | 5/2016 |
| JP | 2020-101780 A | 7/2020 |

* cited by examiner

OPTICAL ELEMENT PART INCLUDING AT LEAST TWO OPTICAL CHARACTERISTIC REGIONS, AND TURRET, OPTICAL ELEMENT DEVICE, AND CAMERA INCLUDING THE SAME

RELATED APPLICATIONS

The present application is National Phase of International Application No. PCT/JP2022/006947 filed on Feb. 21, 2022, and claims priority from Japanese Patent Application No. 2021-032176, filed on Mar. 1, 2021, the disclosure of which is hereby incorporated by reference herein in its entirety.

TECHNICAL FIELD

The present invention relates to turret-type optical element devices, and more particularly relates to a turret-type optical element device including an optical element part and used by being attached to a lensless camera, the optical element part having two or more optical characteristic regions different in characteristics from each other, out of optical characteristics possessed by an optical element, an optical element part used for the turret-type optical element device, a turret used for the turret-type optical element device, and a camera including the turret-type optical element device and the lensless camera.

BACKGROUND ART

There have been known turret-type filter devices that can be attached to existing lensless cameras for easy use, with a plurality of optical filters being disposed on a circumferential surface of the filter device. The filter device appropriately selects a filter, which meets imaging conditions, from a turret-type filter disk and inserts the selected filter into an optical path of a camera optical system so as to optimize the imaging conditions.

As for a fixing structure to fix the filters to the filter disk, the filters that do not need replacement may be fixed by bonding, and the filters that are frequently used and need replacement may be fixed by fastening a member, such as a pressing plate, with screws (Patent Literature 1).

There has also been proposed a filter disk device including a plurality of filter attaching frame parts, in which one of the filter attaching frame parts is formed larger than the outer size of a filter to be replaced. Accordingly, since the attaching frame part of the filter to be replaced can be selected and inserted into an optical path of the camera optical system, the replacement of the filter can easily be performed through the selected attaching frame part (Patent Literature 2).

In addition, there are turret lenses that allow lens replacement by rotating a plurality of lenses, and also pinhole cameras having pinhole patterns in the optical path to obtain an image of a subject on an image plane without the need for a lens or other members.

[Patent Literature 1] Japanese Patent No. 3483320
[Patent Literature 2] Japanese Patent Application Laid-Open No. 2020-101780

SUMMARY OF INVENTION

Technical Problem

Until now, in the case of configuring a filter disk device that allows selection of a plurality of types of filters, a filter of each type needed to be prepared. In addition, the prepared filters needed to be attached to corresponding filter attaching frames of a turret one by one, and this operation took time and effort.

In the case of the turret lenses, a plurality of lenses were prepared, and the lenses were fitted to the corresponding lens frames of the turret. When replacing the lenses, the lenses needed to be replaced one by one.

When, for example, the pinhole patterns of a pinhole camera are applied to a conventional turret-type filter or turret lens, the respective pinhole patterns are attached to corresponding pinhole pattern attaching frames of the turret at the time of changing the pinhole patterns. When replacing the pinhole patterns, it is still necessary to replace the pinhole patterns one by one.

An object of the present invention is to provide a turret-type optical element device including an optical element part that includes two or more optical characteristic regions different in characteristics from each other, out of optical characteristics possessed by an optical element, the turret-type optical element device allowing replacement of two or more optical characteristics by a single replacement of members or allowing easy replacement of each optical characteristic member by a single disassembly and replacement work, an optical element part used for the turret-type optical element device, a turret used for the turret-type optical element device, and a camera including the turret-type optical element device and a lensless camera.

Solution to Problem

A turret-type optical element device used for a camera in the present invention is a turret-type optical element device used for a camera, comprising: an attaching part to a lensless camera, the attaching part including no optical elements on an optical path; and a turret provided rotatably with respect to a substrate having an optical path opening, wherein the turret includes an optical element part having two or more optical characteristic regions different in characteristics from each other, out of optical characteristics possessed by an optical element, the turret being configured to allow each of the optical characteristic regions to face the optical path opening by rotating the turret, the optical element part itself is an integrally formed product that is detachably attached to the turret, and the turret-type optical element device is used by being attached to the lensless camera by the attaching part, and constitutes an imaging system that includes no optical elements, other than the optical element part on the turret, on the optical path.

The each of the optical characteristic regions is configured by forming two or more patterns different in characteristics from each other, the patterns constituted of a transmission region that transmits incoming light and a shielding region that shields the light, or forming two or more lenses different in characteristics from each other, or forming two or more of the patterns or the lenses.

The turret includes a turret body having two or more openings, the turret body being configured to allow the openings to face the optical path opening by rotating the turret, and an element pressing part that presses the optical element part, the element pressing part having two or more openings formed in shapes and positions substantially identical to those of the openings of the turret body when being attached to the turret body, the optical element part is an integrally formed product wherein when being attached to the turret, portions other than the respective optical characteristic regions are brought into contact with a surface portion of the turret body other than the openings of the turret body and are also brought into contact with a portion of the element pressing part other than the openings of the element pressing part, and the respective optical characteristic regions are provided in substantially identical positions to those of the openings of the turret body and the element pressing part, and the optical element part is attached to the turret body, and the element pressing part is further attached to the turret body.

The turret body has a recess in a shape corresponding to the optical element part, and when the optical element part is attached to the turret, the optical element part is fitted to a bottom surface of the recess of the turret body by bringing at least the portions of the optical element part other than the respective optical characteristic regions into contact with the bottom surface, and then the element pressing part is further attached to the turret body.

The patterns are pinhole patterns, zone plate patterns, or photon sieve patterns.

The turret-type optical element device comprising two or more of the turrets that are rotatable with respect to the substrate, wherein the respective turrets include the optical element part having the optical characteristic regions different from or identical to each other.

An optical element part used for the turret-type optical element device, itself is an integrally formed product that is detachably attached to the turret.

A turret used for the turret-type optical element device.

A camera comprising: the turret-type optical element device and a lensless camera.

Advantageous Effects of Invention

According to the turret-type optical element device of the present invention, a desired optical characteristic region can easily be inserted into the optical path of a camera optical system. The desired optical characteristic region can be selected by rotating the turret. When the optical element part itself is an integrally molded product, two or more optical characteristics can be replaced by a single replacement of the optical element part. When the optical element part is an integrally formed product that is integrally formed with a turret, two or more optical characteristics can be replaced by a single replacement of the turret.

According to the turret-type optical element device of the present invention, a desired optical characteristic region can easily be inserted into the optical path of a camera optical system. The desired optical characteristic region can be selected by rotating the turret. The turret is constituted of an attachable/detachable turret body and an element pressing part. The turret body has a recess formed in a shape corresponding to two or more optical characteristic members different in characteristics from each other, the characteristic members constituting the optical element part. The optical characteristic members are fitted to the recess and pressed by the element pressing part for attachment. This makes it possible to easily disassemble the turret into the turret body and the element pressing part, and to stably fit and attach each optical characteristic member, and allows easy replacement of each optical characteristic member by a single disassembly and replacement work.

According to the optical element part of the present invention, using the turret-type optical element device, a desired optical characteristic region can easily be inserted into the optical path of a camera optical system. The desired optical characteristic region can be selected by rotating the turret. And two or more optical characteristics can be replaced by a single replacement of the optical element part.

According to the turret of the present invention, using the turret-type optical element device, a desired optical characteristic region can easily be inserted into the optical path of a camera optical system. The desired optical characteristic region can be selected by rotating the turret. And two or more optical characteristics can be replaced by a single replacement of the turret.

According to the camera of the present invention comprising the turret-type optical element device and a lensless camera, by the turret-type optical element device a desired optical characteristic region can easily be inserted into the optical path of a camera optical system. The desired optical characteristic region can be selected by rotating the turret. When the optical element part itself is an integrally molded product, two or more optical characteristics can be replaced by a single replacement of the optical element part. When the optical element part is an integrally formed product that is integrally formed with a turret, two or more optical characteristics can be replaced by a single replacement of the turret

DESCRIPTION OF EMBODIMENTS

Embodiments of the present invention will be described with reference to the drawings. However, the embodiments described below are merely illustrative and are not intended to exclude various modifications and technical applications not specified below. Therefore, various modifications (such as combining each embodiment) of the present invention can be implemented as long as the effects of the invention are demonstrated. In the following description of the drawings, like or similar component members are designated by like or similar signs. The drawings are exemplary and are not necessarily representative of actual sizes, ratios, and the like. The drawings may include portions different from each other in size relationship and ratio.

First Embodiment

Figure 1:
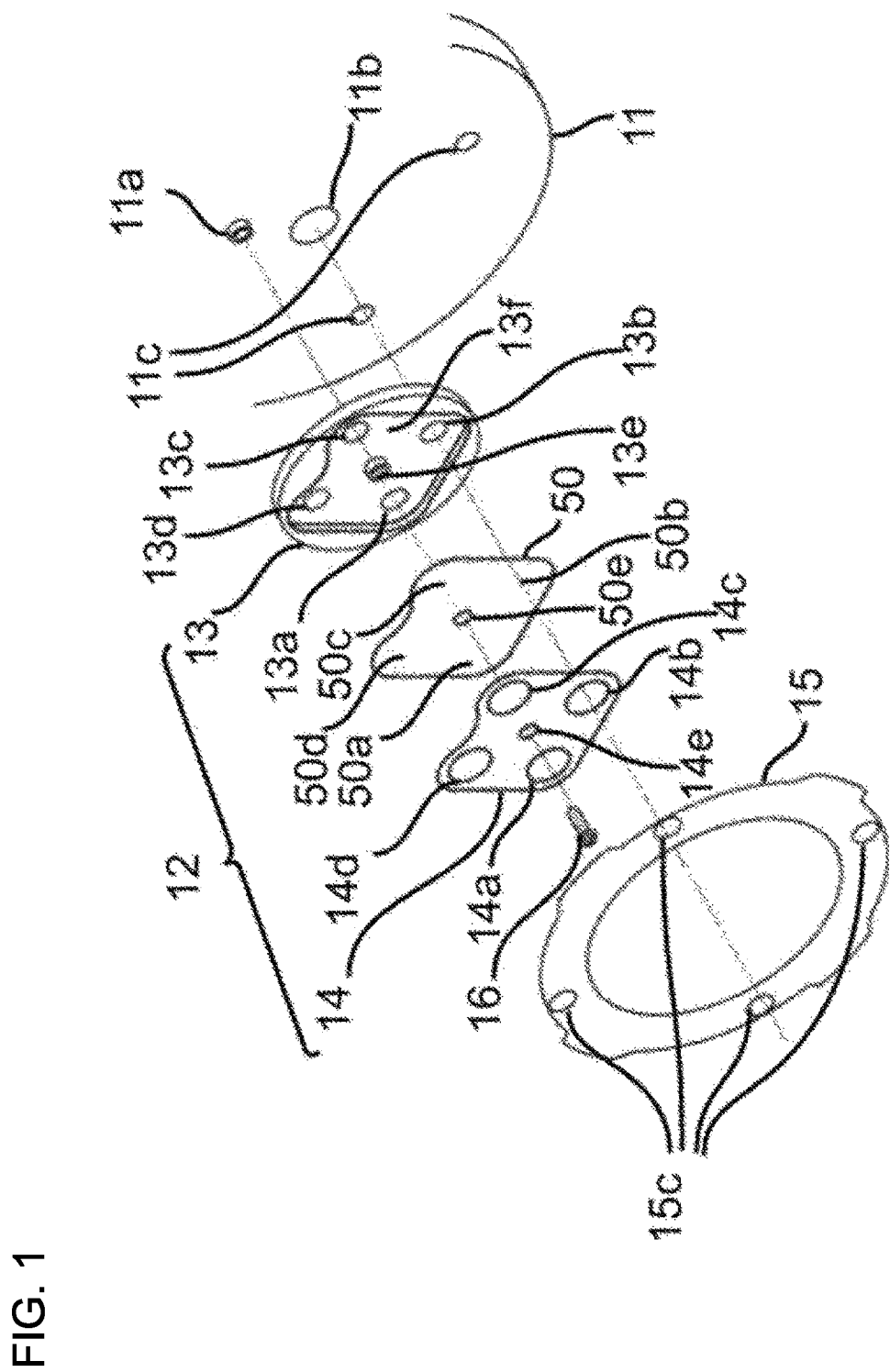
FIG. 1 is an exploded schematic perspective view of a turret-type optical element device 100 according to a first embodiment.
Figure 2:
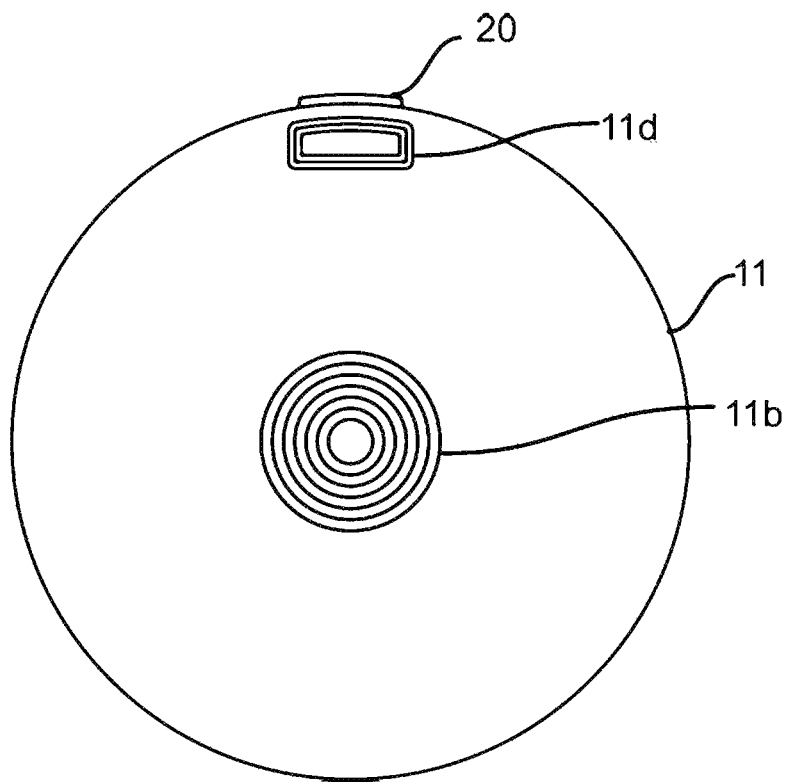
FIG. 2 is an appearance explanatory view of the turret-type optical element device 100.
Figure 3:
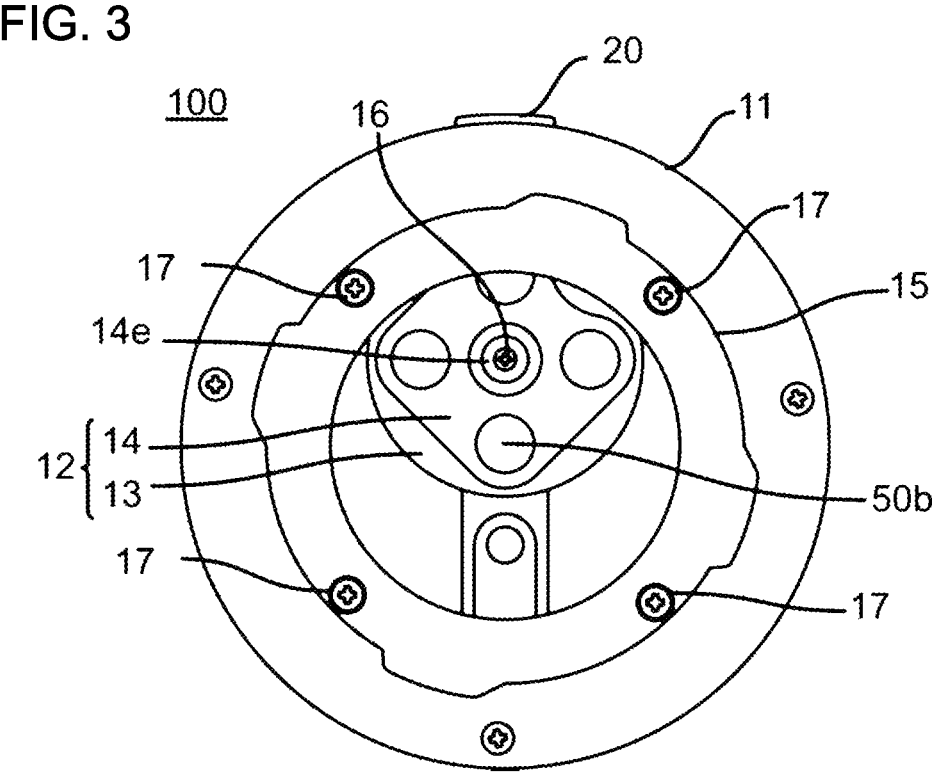
FIG. 3 is an appearance explanatory view of the turret-type optical element device 100.

FIG. 1 is an exploded schematic perspective view to illustrate a turret-type optical element device 100, which is a first embodiment of the present invention. FIGS. 2 and 3 are appearance explanatory views of the turret-type optical element device 100. FIG. 2 shows the appearance of the turret-type optical element device 100 as viewed from a subject side when the turret-type optical element device 100 is attached to an existing lensless camera. FIG. 3 shows the appearance of the turret-type optical element device 100 as viewed from the side of the turret-type optical element device 100 which is attached to the existing lensless camera.

The turret-type optical element device 100 according to the first embodiment is the turret-type optical element device 100 used for a camera. The turret-type optical element device 100 includes a camera attaching frame body 15 as an example of an attaching part to a lensless camera, the camera attaching frame body 15 including no optical elements on an optical path, and a turret 12 provided rotatably with respect to a substrate 11 having an optical path opening 11b. The turret 12 includes an optical element part 50 including two or more optical characteristic regions 50a, 50b, 50c, and 50d different in characteristics from each other, out of the optical characteristics possessed by an optical element. The turret 12 is configured to allow each of the optical characteristic regions 50a, 50b, 50c, and 50d to face the optical path opening 11b when the turret 12 is rotated. The optical element part 50 itself is an integrally formed product that is detachably attached to the turret 12. The turret-type optical element device 100 is used by being attached to the lensless camera by the camera attaching frame body 15 as an example of the attaching part, and is essentially configured to constitute an imaging system that includes no optical elements, other than the optical element part 50 on the turret 12, on the optical path.

Furthermore, the turret-type optical element device 100 described below is an example in the case where the optical element part itself is an integrally formed product. In this example, the turret 12 includes a turret body 13 having two or more openings 13a, 13b, 13c, and 13d, the turret body 13 being configured to allow the openings to face the optical path opening 11b when the turret 12 is rotated, and an element pressing part 14 that presses the optical element part 50, the element pressing part 14 having two or more openings 14a, 14b, 14c, and 14d formed in shapes and positions substantially identical to those of the openings 13a, 13b, 13c, and 13d of the turret body 13 when being attached to the turret body 13. The optical element part 50 is an integrally molded product having the respective optical characteristic regions 50a, 50b, 50c and 50d in positions substantially identical to those of the openings 13a, 13b, 13c, and 13d of the turret body 13 and to those of the openings 14a, 14b, 14c and 14d of the element pressing part 14 when being attached to the turret 12. The optical element part 50 is attached to the turret body 13, and the element pressing part 14 is further attached to the turret body 13.

The substrate 11, which has a substantially circular shape, has a shaft 11a with a screw hole. Below the shaft 11a in FIG. 1, the optical path opening 11b is formed into a circular shape.

The turret body 13 has a recess 13f in a shape corresponding to the optical element part 50. The openings 13a, 13b, 13c and 13d of the turret body 13 are formed in the recess 13f. The element pressing part 14 is formed in a substantially identical shape to that of the recess 13f.

The optical element part 50 is detachably attached to the turret 12. When the optical element part 50 is attached to the turret 12, the optical element part 50 is fitted and attached to the recess 13f of the turret body 13, and the element pressing part 14 is further fitted and attached thereto. When the optical element part 50 is attached to the turret 12, the respective optical characteristic regions 50a, 50b, 50c, and 50d different in characteristics from each other, out of the optical characteristics possessed by the optical element in the optical element part 50, are exposed through the openings 13a, 13b, 13c, and 13d of the turret body 13 and through the openings 14a, 14b, 14c, and 14d of the element pressing part 14, respectively.

The turret body 13, the optical element part 50, and the element pressing part 14 have holes 13e, 50e, and 14e formed substantially at their respective centers. When the optical element part 50 is attached to the turret 12, the optical element part 50 is first fitted to the turret body 13, and then the element pressing part 14 is fitted and attached to the recess 13f from above the optical element part 50. Then, the turret 12 including the optical element part 50 is rotatably supported by the shaft 11a of the substrate 11 through a screw 16.

The substrate 11 has four screw holes 11c formed for attaching the camera attaching frame body 15 as an example of the attaching part for attaching to the lensless camera. In FIG. 1, two screw holes 11c are illustrated, and two more screw holes 11c are omitted. The camera attaching frame body 15, which includes the turret 12 inside and which has four screw holes 15C formed therein, is screwed to the substrate 11 with screws 17. The turret-type optical element device 100 is attached to an existing lensless camera (not shown), with the existing lensless camera (not shown) being on the side of the camera attaching frame body 15. Thus, a camera (imaging device) including the turret-type optical element device 100 of the present invention and the lensless camera is constructed.

The optical element part 50 includes two or more optical characteristic regions 50a, 50b, 50c, and 50d different in characteristics from each other, out of the optical characteristics possessed by the optical element. The material of the optical element part 50 is not particularly limited, and examples of the optical element part 50 include resin sheets, glass sheets, and metals, which are integrally molded products. The optical element part 50 is configured by forming, for example, two or more patterns different in characteristics from each other, the patterns constituted of a transmission region that transmits incoming light and a shielding region that shields the light. As will be described later in detail with FIG. 16A, the optical element part 50 has, for example, at least one pattern out of a pinhole pattern, a zone plate pattern, and a photon sieve pattern. The optical characteristics will be described in detail in a second embodiment.

While the turret 12 including the optical element part 50 is attached to the substrate 11, the opening 13a, 13b, 13c, or 13d of the turret body 13 faces the optical path opening 11b. In other words, any of the optical characteristic regions 50A, 50b, 50c, and 50d of the optical element part 50, exposed through the opening 13a, 13b, 13c, or 13d of the turret body 13, faces the optical path opening 11b and is disposed on the optical path of the camera optical system. In the example of FIGS. 1 and 3, the opening 13b of the turret body 13 faces the optical path opening 11b, and the optical characteristic region 50b of the optical element part 50 exposed through the opening 13b is disposed on the optical path of the camera optical system shown by an alternate long and short dash line.

In FIG. 1, the optical path of the camera optical system is shown by an alternate long and short dash line. In the illustrated example, a subject image from the side of the substrate 11 enters a camera body through the optical path opening 11b of the substrate 11, the opening 13b of the turret body 13, the optical characteristic region 50b of the optical element part 50 inserted into the optical path, and the opening 14b of the element pressing part 14.

The desired optical characteristic regions 50a, 50b, 50c, and 50d of the optical element part 50 are used in alignment with the optical path opening 11b. Specifically, the turret-type optical element device 100 includes an operating mechanism (not shown) to rotate the turret 12. When a user puts his or her finger on an operating portion of the operating mechanism, which is exposed from the body of the turret-type optical element device 100, to rotate the turret 12 around the shaft 11a, the optical characteristic regions 50a, 50b, 50c, and 50d of the optical element part 50 are replaced and disposed.

At this time, in order to allow the user to recognize, from the outside, the optical characteristics of the selected and disposed optical characteristic regions 50a, 50b, 50c, and 50d, the substrate 11 may include an information display window 11d. The information display window 11d is configured to allow the user to recognize the optical characteristics of the selected optical characteristic regions 50a, 50b, 50c, and 50d by causing information that identifies the optical characteristics possessed by the selected optical characteristic region (optical characteristic identification information, that is, "0.20 mm pinhole" for example) to change in conjunction with the operating mechanism (not shown) that rotates the turret 12.

Thus, according to the turret-type optical element device 100 in the first embodiment, the desired optical characteristic regions 50a, 50b, 50c, and 50d can easily be inserted into the optical path of the camera optical system, while the turret-type optical element device 100 is attached to an existing lensless camera. The desired optical characteristic region can be selected by rotating the turret 12.

Furthermore, the turret 12 is constituted of the attachable/detachable turret body 13 and the element pressing part 14, with the optical element part 50 being attached to the turret 12 by attaching the optical element part 50 to the turret body 13 and pressing the optical element part 50 by the element pressing part 14. This makes it possible to easily disassemble the turret 12 into the turret body 13 and the element pressing part 14 for replacement of the optical element part 50. In addition, since the optical element part 50 having two or more optical characteristic regions is formed as an integrally molded product, two or more optical characteristics can be replaced by a single replacement of the optical element part 50.

Since the turret 12 is provided within the configuration including the substrate 11 and the camera attaching frame body 15 as an example of the attaching part, it is possible to implement the turret-type optical element device 100 that is more resistant to scratches and impacts than the turret-type optical element device 100 with the turret 12 being exposed.

The method of attaching the optical element part 50 to the turret 12 is not limited to the method described above. For example, an attaching frame for attaching the optical element part 50 to the turret body 13 may be formed in a substantially identical shape to the optical element part 50, and the optical element part 50 may be fitted to the attaching frame for attaching the optical element part 50 to the turret 12.

In the present embodiment, the recess 13f in the shape corresponding to the optical element part 50 is configured in the turret body 13, and the openings 13a, 13b, 13c, and 13d are formed in the recess 13f. After the optical element part 50 is fitted to the recess 13f, the element pressing part 14 is fitted and attached to the recess 13f from above the optical element part 50. As a result, the portions of the optical characteristic regions 50a, 50b, 50c, and 50d of the optical element part 50 are exposed through the openings 13a, 13b, 13c, and 13d of the turret body 13 and through the openings 14a, 14b, 14c, and 14d of the element pressing part 14, respectively, and the portions of the optical element part 50 other than the optical characteristic regions 50a, 50b, 50c, and 50d are brought into contact with the surface portions of the turret body 13 and the element pressing part 14 for tight fitting. This makes it possible to achieve more stable fixation of the optical element part 50 to the turret 12.

As described in the foregoing, the turret-type optical element device 100 according to the first embodiment includes one turret 12, though the turret-type optical element device 100 may include two or more turrets.

A turret-type optical element device 200 according to a second embodiment is an example where the turret-type optical element device includes two turrets.

Second Embodiment

Figure 6:
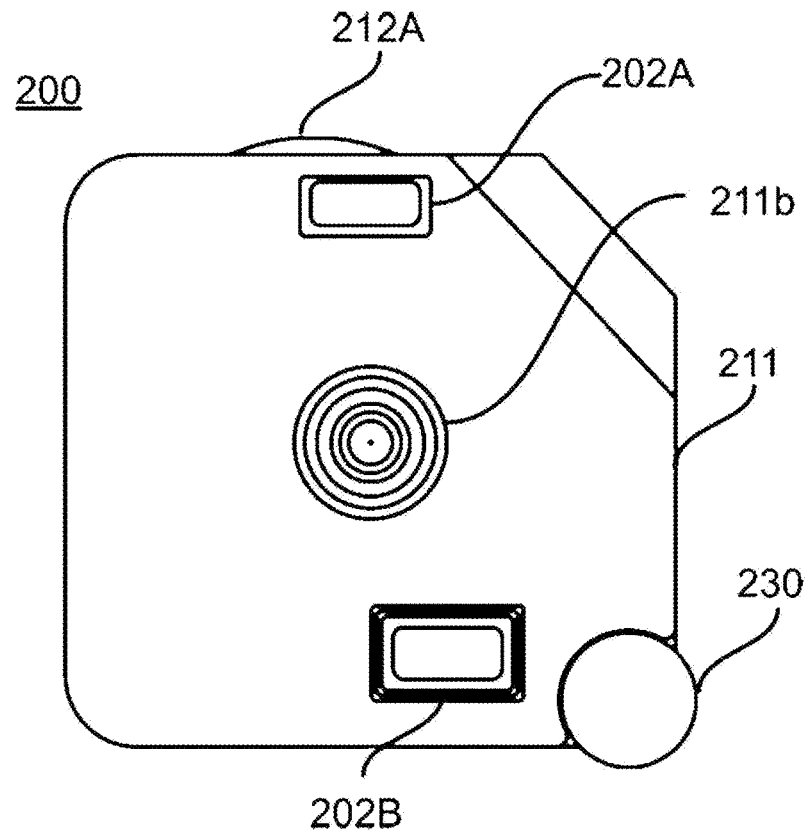
FIG. 6 is an appearance explanatory view of a turret-type optical element device 200 according to a second embodiment.
Figure 7:
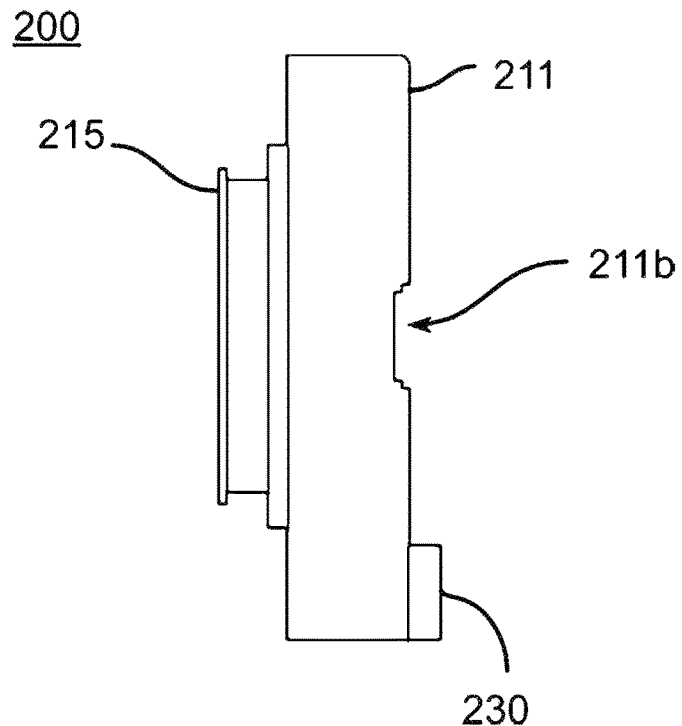
FIG. 7 is a side view of the turret-type optical element device 200.
Figure 8:
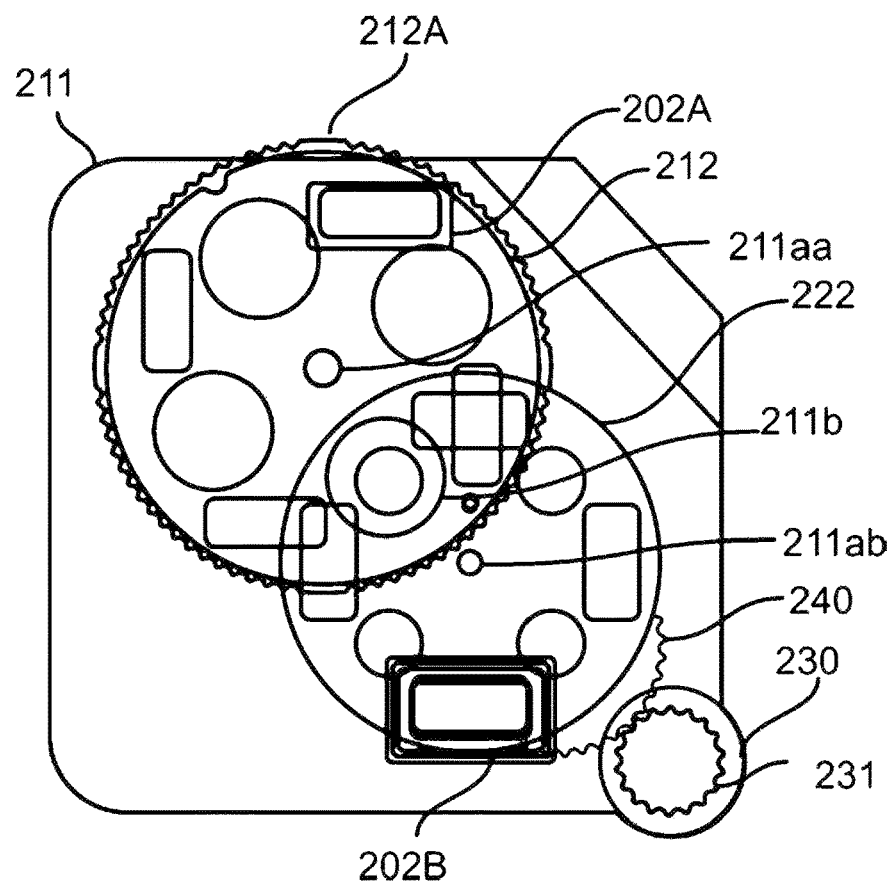
FIG. 8 is a schematic explanatory view of main parts of the turret-type optical element device 200.

FIG. 6 is an appearance explanatory view of the turret-type optical element device 200 according to the second embodiment of the present invention. FIG. 7 is a side view of the turret-type optical element device 200. FIG. 8 is a schematic explanatory view of main parts of the turret-type optical element device 200.

The turret-type optical element device 200 includes a turret 212 and a turret 222 that are provided rotatably with respect to a substrate 211 having an optical path opening 211b. The configuration of the substrate 211 similar to that of the substrate 11 may be omitted. The configuration of the turret 212 and the turret 222 similar to that of the turret 12 may be omitted.

Figure 9:
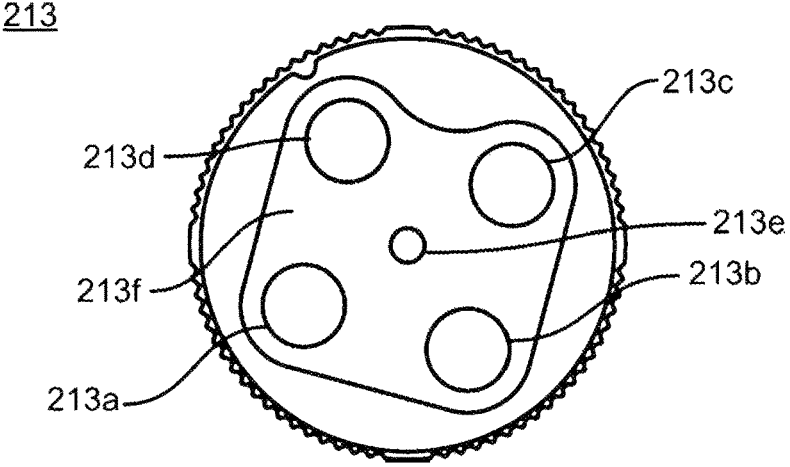
FIG. 9 is a plan view of a turret body 213.
Figure 10:
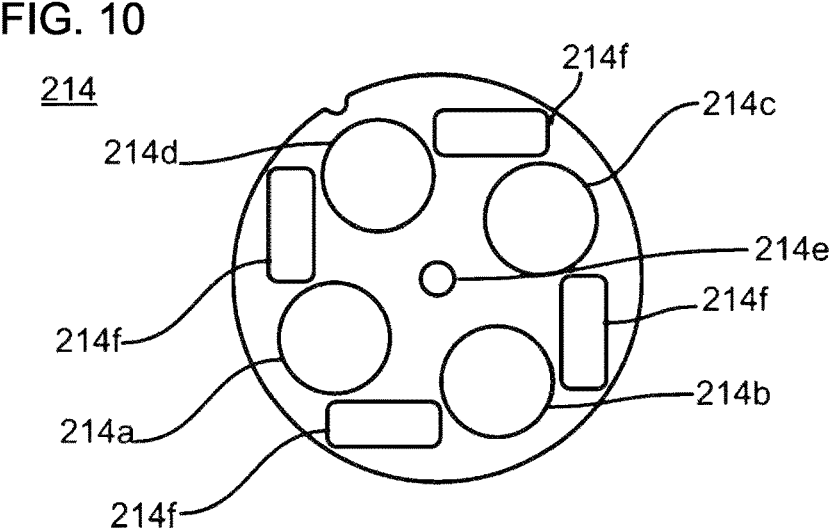
FIG. 10 is a plan view of an element pressing part 214.
Figure 11:
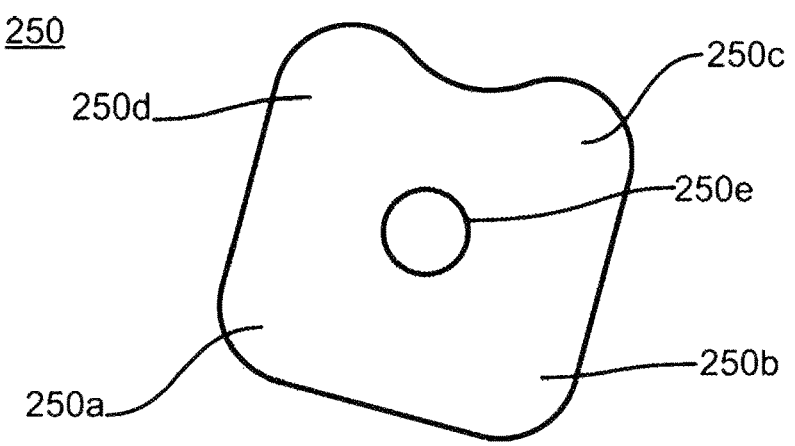
FIG. 11 is a plan view of the optical element part 250.
Figure 12A:
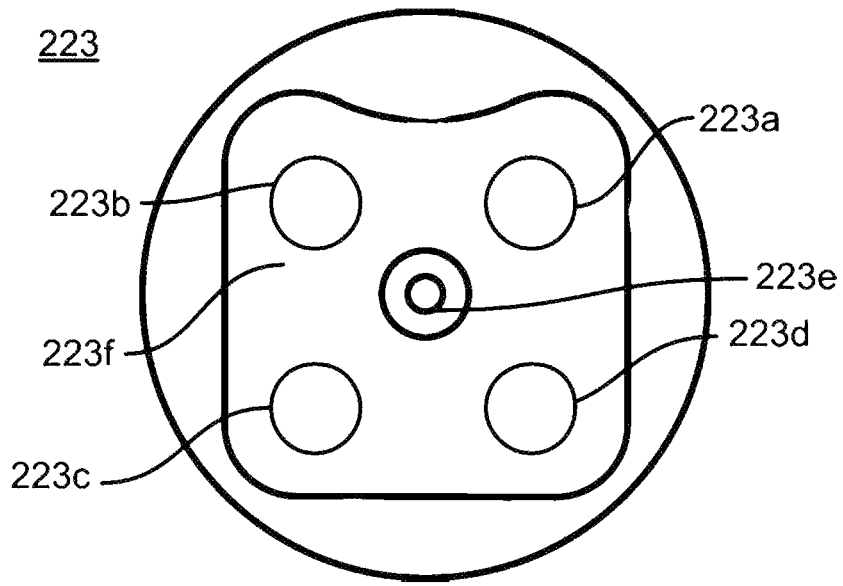
FIG. 12A is a plan view of the front side of a turret body 223.
Figure 12B:
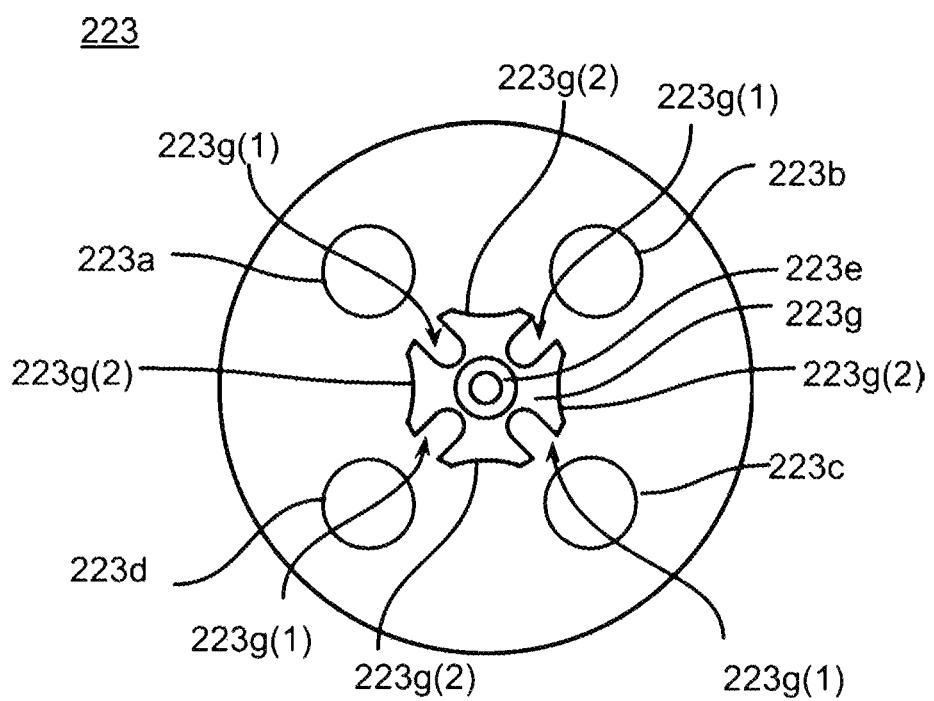
FIG. 12B is a plan view of the back side of the turret body 223.
Figure 13:
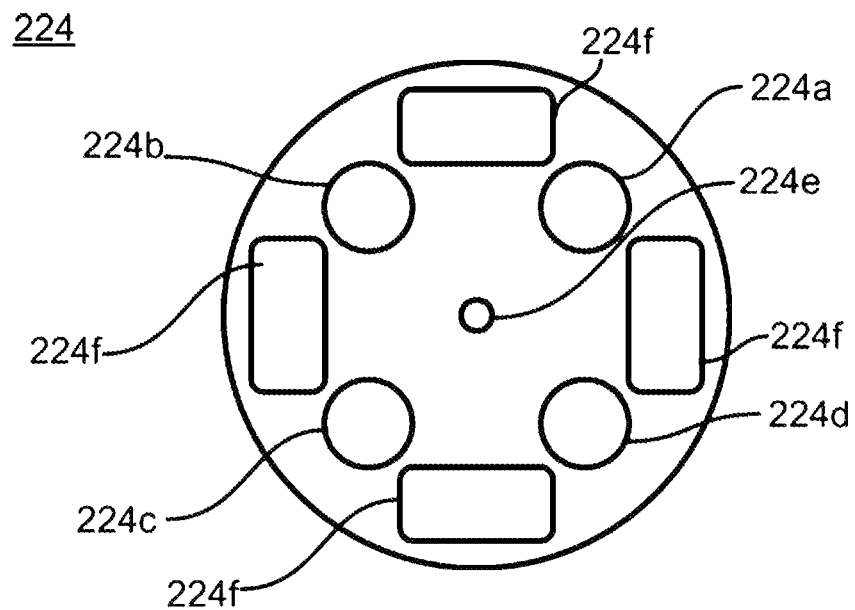
FIG. 13 is a plan view of an element pressing part 224.
Figure 14:
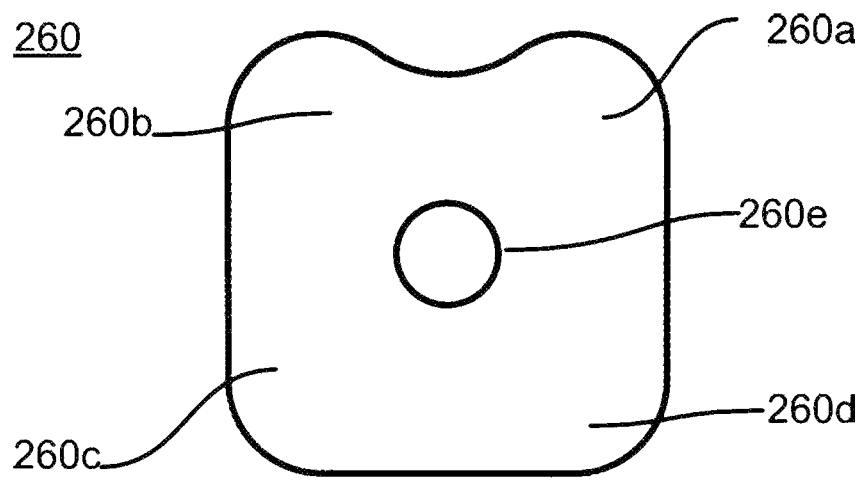
FIG. 14 is a plan view of the optical element part 250.

FIG. 9 is a plan view of a turret body 213. FIG. 10 is a plan view of an element pressing part 214. FIG. 11 is a plan view of an optical element part 250. FIG. 12A is a plan view of the front side of a turret body 223. FIG. 12B is a plan view of the back side of the turret body 223. FIG. 13 is a plan view of an element pressing part 224. FIG. 14 is a plan view of an optical element part 260.

Like the optical element part 50 described in the first embodiment, the optical element part 250 and the optical element part 260 themselves are integrally formed products. The optical element part 250 is detachably attached to the turret 212, and the optical element part 260 is detachably attached to the turret 222. The configuration of the optical element part 250 and the optical element part 260, which is similar to that of the optical element part 50 described in the first embodiment, such as the configuration including two or more optical characteristic regions different in characteristics from each other out of the optical characteristics possessed by the optical element, may be omitted.

The turret 212 includes the turret body 213 including two or more openings 213a, 213b, 213c, and 213d and configured to allow the openings 213a, 213b, 213c, and 213d to face the optical path opening 211b when the turret 212 is rotated, and the element pressing part 214 that presses the optical element part 250 and that is attachable to the turret body 213, the element pressing part 214 having two or more openings 214a, 214b, 214c, and 214d formed in shapes and positions substantially identical to those of the openings 213a, 213b, 213c, and 213d of the turret body 213, when being attached to the turret body 213.

The optical element part 250 includes optical characteristic regions 250a, 250b, 250c, and 250d different in characteristics from each other, out of the optical characteristics possessed by the optical element, in positions substantially identical to those of the openings 213a, 213b, 213c, and 213d of the turret body 213 and the openings 214a, 214b, 214c, and 214d of the element pressing part 214, respectively, when the optical element part 250 is attached to the turret 212.

The turret body 213 has a recess 213f in a shape corresponding to the optical element part 250. The openings 213a, 213b, 213c, and 213d of the turret body 213 are formed in the recess 213f. The element pressing part 214 is formed in a substantially identical shape to that of the recess 213f.

The optical element part 250 is detachably attached to the turret 212. When the optical element part 250 is attached to the turret 212, the optical element part 250 is fitted and attached to the recess 213f of the turret body 213, and the element pressing part 214 is further fitted and attached thereto. When the optical element part 250 is attached to the turret 212, the optical characteristic regions 250a, 250b, 250c, and 250d of the optical element part 250 are exposed through the openings 213a, 213b, 213c, and 213d of the turret body 213 and the openings 214a, 214b, 214c, and 214d of the element pressing part 214, respectively.

The turret body 213, the optical element part 250, and the element pressing part 214 have holes 213e, 250e, and 214e formed substantially at their respective centers. The turret 212 including the optical element part 250 is rotatably supported by an axis 211aa having a screw hole, which is provided in the substrate 211, through a screw (not shown).

The desired optical characteristic regions 250a, 250b, 250c, and 250d of the optical element part 250 are used in alignment with the optical path opening 211b. Specifically, when a user puts his or her finger on a portion 212A of the turret 212, which is exposed from the body of the turret-type optical element device 200, to rotate the turret 212 around the shaft 211aa, the optical characteristic regions 250a, 250b, 250c, and 250d of the optical element part 250 are replaced and disposed in alignment with the optical path opening 211b.

The turret 222 includes the turret body 223 having two or more openings 223a, 223b, 223c, and 223d and configured to allow the openings 223a, 223b, 223c, and 223d to face the optical path opening 211b when the turret 222 is rotated, and the element pressing part 224 that presses the optical element part 260 and that is attachable to the turret body 223, the element pressing part 224 having two or more openings 224a, 224b, 224c, and 224d formed in shapes and positions substantially identical to those of the openings 223a, 223b, 223c, and 223d of the turret body 223, when being attached to the turret body 223.

The optical element part 260 includes optical characteristic regions 260a, 260b, 260c, and 260d different in characteristics from each other, out of the optical characteristics possessed by the optical element, in positions substantially identical to those of the openings 223a, 223b, 223c, and 223d of the turret body 223 and the openings 224a, 224b, 224c, and 224d of the element pressing part 224, respectively, when the optical element part 260 is attached to the turret 222.

The turret body 223 has a recess 223f in a shape corresponding to the optical element part 260. The openings 223a, 223b, 223c, and 223d of the turret body 223 are formed in the recess 223f. The element pressing part 224 is formed in a shape substantially identical to the recess 223f.

The optical element part 260 is detachably attached to the turret 222. When the optical element part 260 is attached to the turret 222, the optical element part 260 is fitted and attached to the recess 223f of the turret body 223, and the element pressing part 224 is further fitted and attached thereto. When the optical element part 260 is attached to the turret 222, the optical characteristic regions 260a, 260b, 260c, and 260d of the optical element part 260 are exposed through the openings 223a, 223b, 223c, and 223d of the turret body 223 and the openings 224a, 224b, 224c, and 224d of the element pressing part 224, respectively.

The turret body 223, the optical element part 260, and the element pressing part 224 have holes 223e, 260e, and 224e formed substantially at their respective centers. The turret 222 including the optical element part 260 is rotatably supported, through a screw (not shown), to a shaft 211ab having a screw hole which is provided in the substrate 211. The desired optical characteristic regions 260a, 260b, 260c, and 260d of the optical element part 260 are used in alignment with the optical path opening 211b.

The turret 222 in the present embodiment has a Geneva mechanism that is rotationally driven intermittently during one rotation.

Figure 15:
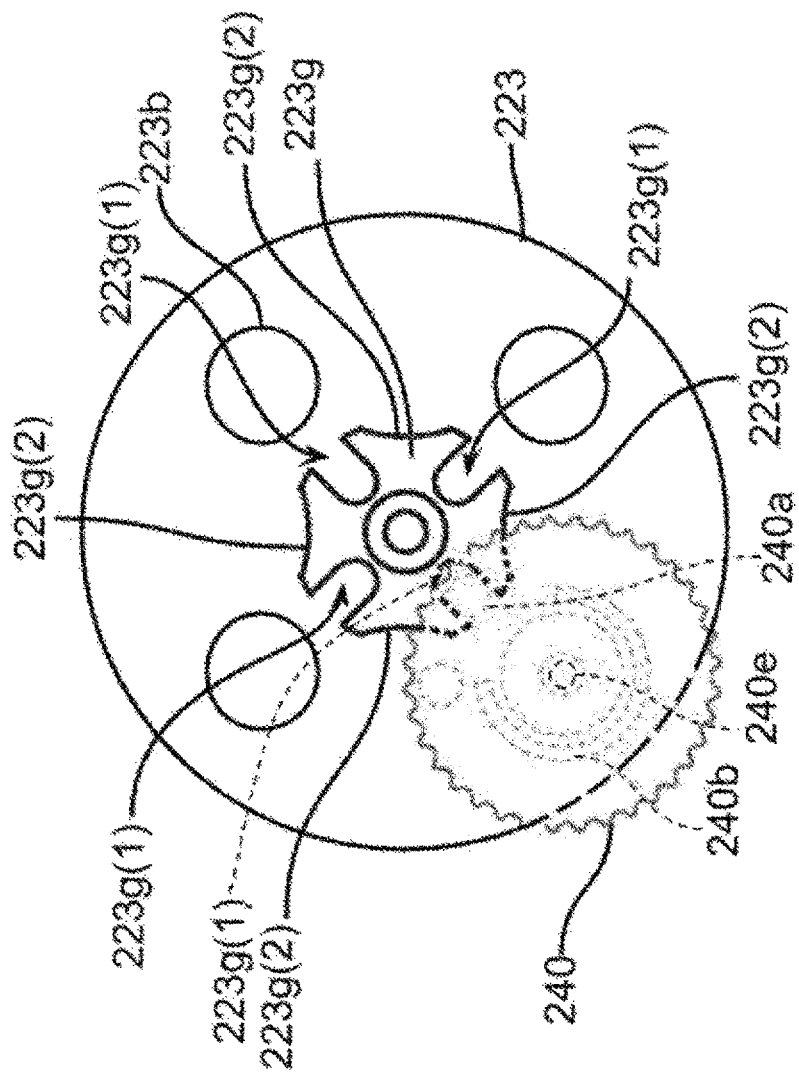
FIG. 15 is an explanatory view of a Geneva mechanism.

FIG. 15 is an explanatory view of the Geneva mechanism for rotating the turret 222. FIG. 15 is an explanatory view of the turret 222 and a driving rotary body 240 as viewed from the back side, when FIG. 8 that is the schematic explanatory view showing the main parts of the turret-type optical element device 200 is assumed to show the front side.

As shown in FIGS. 8 and 15, or other drawings, the driving rotary body 240 is provided on the back side of the turret body 223. When the user puts his or her finger on a rotary operation part 230 exposed from the body of the turret-type optical element device 200 to rotate the driving rotary body 240, a gear 231 of the rotary operation part 230 configured inside the rotary operation part 230 engages with the driving rotary body 240 so that the driving rotary body 240 rotates around a rotary shaft 240e.

The turret body 223 includes a driven rotary body 223g. In the driven rotary body 223g, slots 223g(1) open toward radially outside and arcuate portions 223g(2) are formed along the direction of rotation. The driven rotary body 223g is fixed to the turret body 223.

The driving rotary body 240 includes an engaging body 240a that engages with the slots 223g(1) of the driven rotary body 223g to intermittently drive and rotate the driven rotary body 223g at a predetermined angle. The driving rotary body 240 also includes a cam part 240b, which relatively moves along arcuate surfaces of the arcuate portions 223g(2) of the driven rotary body 223g, when the engaging body 240a leaves the slots 223g(1).

When the driving rotary body 240 rotates, the engaging body 240a enters each of the slots 223g(1) of the driven rotary body 223g and rotates the driven rotary body 223g. When the driving rotary body 240 rotates further and the engaging body 240a is detached from one of the slots 223g(1), the cam part 240b rotates in contact with the arcuate surface of the arcuate portion 223g(2) of the driven rotary body 223g, and the engaging body 240a is engaged with the next slot 223g(1).

With such configuration, the turret 222 in the present embodiment is intermittently rotated by 90 degrees. This allows the optical characteristic regions 260a, 260b, 260c, and 260d of the optical element part 260 to face the optical path opening 211b in sequence.

The turret 222 adopting such a Geneva mechanism can align the central parts of the optical characteristic regions with an optical path line with relatively high accuracy. This configuration is useful when the optical characteristic regions of the optical element part 260 have optical characteristics corresponding to pinholes or lenses in particular.

The turret-type optical element device 200 is attached to an existing lensless camera and used, with the existing lensless camera being on the side of a camera attaching part 215 that is an example of the attaching part to the lensless camera.

When the turret-type optical element device 200 is attached to an existing lensless camera, the turret-type optical element device 200 may disturb the user who looks through a viewfinder of the lensless camera. The turret-type optical element device 200 may have a casing configured by cutting out the corner on the side of the viewfinder (see FIG. 6).

Figure 23:
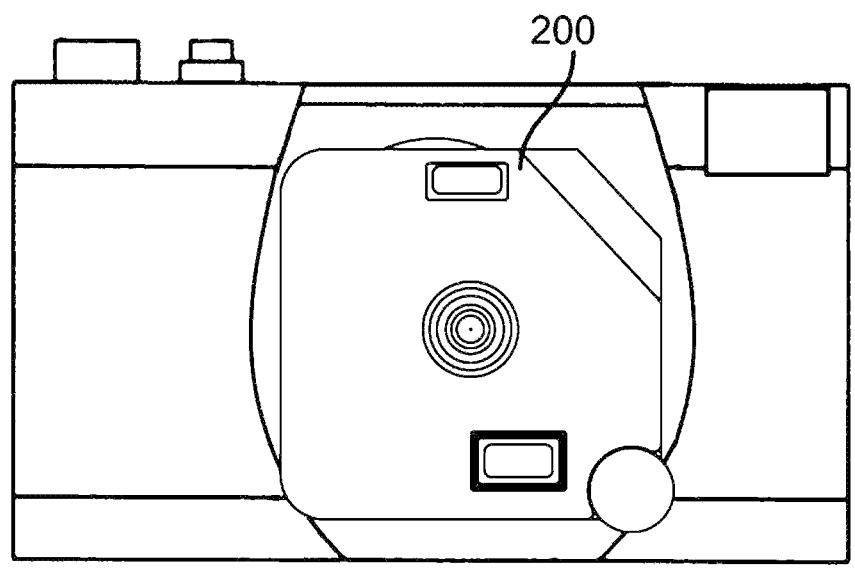
FIG. 23 is an appearance example showing an example of a camera (imaging device) including the turret-type optical element device 200 and a lensless camera.

FIG. 23 shows an appearance example of a camera (imaging device) including the turret-type optical element device and the lensless camera. The turret-type optical element device 200 is configured to allow the user to rotate the rotary operation part 230 exposed from the body of the turret-type optical element device 200 by a finger of the left hand of the user.

The turret-type optical element device 200 may be attached upside down so as to allow the user to operate the rotary operation part 230 by the right hand. In this case, the casing of the turret-type optical element device 200 may have one corner cut off as shown in FIGS. 6 and 23, and may have another corner, which is orthogonal to the one corner, also cut off.

According to the thus-configured turret-type optical element device 200, the optical characteristic corresponding to any of the optical characteristic regions 250a, 250b, 250c, and 250d of the optical element part 250 in the turret 212, and the optical characteristic corresponding to any of the optical characteristic regions 260a, 260b, 260c, and 260d of the optical element part 260 in the turret 222 can be disposed in the optical path of the camera optical system, while the turret-type optical element device 200 is attached to an existing lensless camera.

In addition, the substrate 211 may include information display windows 202A and 202B so that the selected and disposed optical characteristic can be recognized from the outside. The information display window 202A is configured so that information that identifies the optical characteristics possessed by the selected optical characteristic region change in conjunction with the operating mechanism that rotates the turret 212.

For example, as shown in FIGS. 10 and 13, seal sticking parts 214f and 224f is provided in the element pressing parts 214 and 224 to stick seals (not shown) carrying optical characteristic identification information (for example, "0.20 mm pinhole", etc.). The seals carrying the information to identify the optical characteristics of the optical element part 250 included in the turret 212 are stuck to the respective seal sticking parts 214f. The seals carrying the information to identify the optical characteristics of the optical element part 260 included in the turret 222 are stuck to the respective seal sticking parts 224f. Both the seals are stuck so as to allow the information identifying the optical characteristics possessed by the selected optical characteristic regions to be recognized through the information display windows 202A and 202B.

As shown in the example of FIG. 10, when the seal sticking parts 214f are provided in the element pressing part 214, the turret 212 is attached to the substrate 211 so that the element pressing part 214 is on the front side of the substrate 211 (the subject side). The openings 214a, 214b, 214c, and 214d of the element pressing part 214 are configured to be able to face the optical path opening 211b of the substrate 211, and the seals stuck on the seal sticking parts 214f in the element pressing part 214 are configured to be visible through the information display window 202A of the substrate 211.

When the turret 212 is attached to the substrate 211 so that the turret body 213 is on the front side of the substrate 211 (the subject side), the seal sticking parts may be provided on the back side of the turret body 213 shown in FIG. 9 at positions visible through the information display window 202A to stick the seals when the turret 212 is rotated and the optical characteristic region of the optical element part 250 is selected.

The same is true for the example in FIG. 13. Specifically, when the seal sticking parts 224f are provided in the element pressing part 224, the turret 222 is attached to the substrate 211 so that the element pressing part 224 is on the front side of the substrate 211 (the subject side). The openings 224a, 224b, 224c, and 224d of the element pressing part 224 are configured to be able to face the optical path opening 211b of the substrate 211, and the seals stuck on the seal sticking parts 224f in the element pressing part 224 are configured to be visible through the information display window 202B of the substrate 211. When the turret 222 is attached to the substrate 211 so that the turret body 223 is on the front side of the substrate 211 (the subject side), the seal sticking parts may be provided on the back side (FIG. 12B) of the turret body 223 at positions visible through the information display window 202A to stick the seals when the turret 222 is rotated and the optical characteristic region of the optical element part 260 is selected.

In the respective optical characteristic regions 250a, 250b, 250c, and 250d of the optical element part 250 that is attached to the turret 212, two or more optical characteristic regions such as filters different in characteristics from each other are formed, for example. Examples of the characteristics of the filters include: optical characteristics of the filters functioning as color filters that transmit a specific wavelength component as a principal component, the filters functioning as color-temperature conversion filters that convert color tone of white color (correlated color temperature), or the filters functioning as ND filters that regulate the amount of light; and optical characteristics of the filters functioning to transmit all the wavelength components or specific wavelength components in any ranges of 100% to 0%. The material of the optical element part 250 is not particularly limited, and examples of the materials of the optical element part 250 include resin sheets, and glass sheets, which are integrally molded products having translucency.

Figure 4:
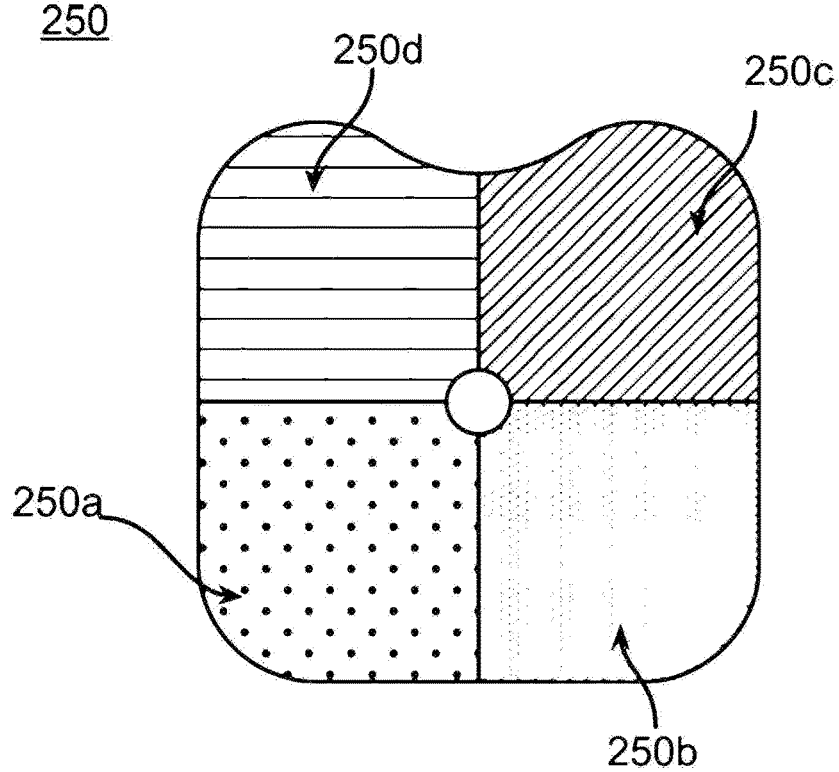
FIG. 4 is an explanatory view of an optical element part 250.

FIG. 4 shows an example of the case where the optical characteristic regions 250*a*, 250*b*, 250*c*, and 250*d* having optical characteristics as filters of each color are configured in the optical element part 250. For example, there is formed the optical element part 250 having the optical characteristic region 250*a* with the optical characteristics as a red filter, the optical characteristic region 250*b* with the optical characteristics as a blue filter, the optical characteristic region 250*c* with the optical characteristics as a yellow filter, and the optical characteristic region 250*d* with the optical characteristics as a green filter.

It is not necessary to configure the entire surface of the optical element part 250 with any of the optical characteristic regions 250*a*, 250*b*, 250*c*, and 250*d* as shown in FIG. 4. For example, the optical element part 250 may be configured so that the optical characteristic regions 250*a*, 250*b*, 250*c*, and 250*d* are exposed through the openings 213*a*, 213*b*, 213*c*, and 213*d* of the turret body 213 and the openings 214*a*, 214*b*, 214*c*, and 214*d* of the element pressing part 214, respectively, when the turret 212 is rotated with the optical element part 250 being attached to the turret 212. In other words, the respective optical characteristic regions 250*a*, 250*b*, 250*c*, and 250*d* may be disposed on the optical path of the camera optical system.

Figure 5A:
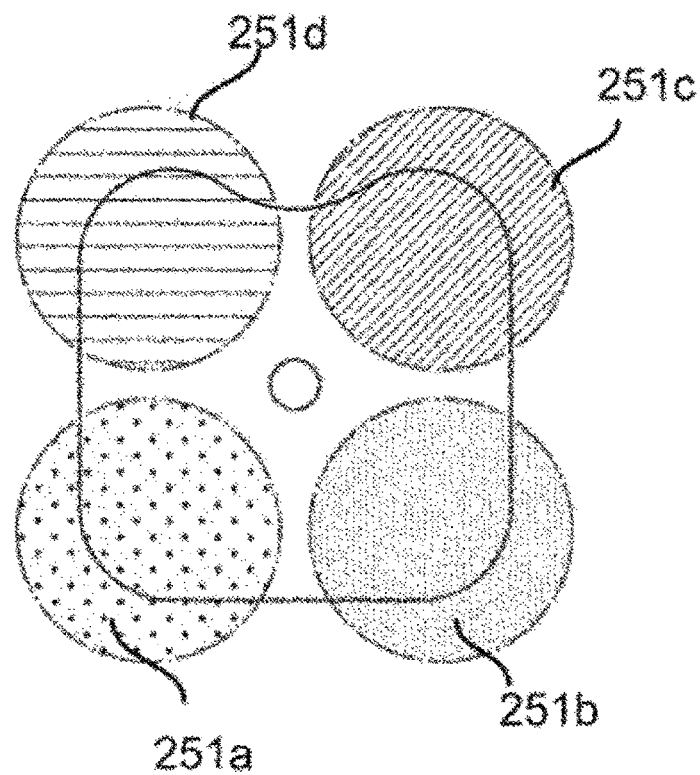
FIG. 5A is an explanatory view of an optical element part 251.

For example, as shown in an optical element part 251 in FIG. 5A, a reddish color may be printed for a print region 251*a*, a bluish color may be printed for a print region 251*b*, and a yellowish color may be printed for a print region 251*c*, and a greenish color may be printed for a print region 251*d*.

Figure 5B:
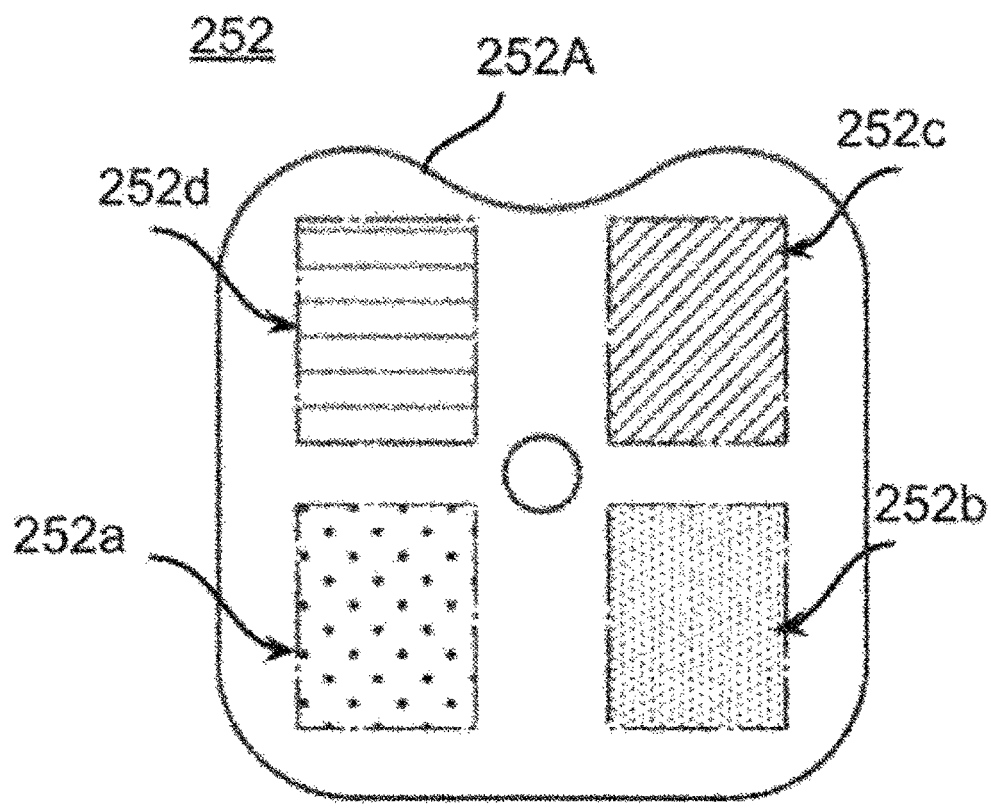
FIG. 5B is an explanatory view of an optical element part 252.

In addition, as shown in an optical element part 252 in FIG. 5B, the optical element part 252 having the optical characteristic regions 252*a*, 252*b*, 252*c*, and 252*d* may be configured by, for example, sticking members with different optical characteristics to a body 252A of the optical element part 252 that is constituted of a transparent resin sheet, a transparent glass sheet, or the like.

For the respective optical characteristic regions 260*a*, 260*b*, 260*c*, and 260*d* of the optical element part 260 that is attached to the turret 222, there are formed two or more patterns different in characteristics from each other (for example, pinhole patterns, zone plate patterns, and photon sieve patterns) which are constituted of a transmission region that transmits incoming light and a shielding region that shields the light, for example.

For example, when a color-temperature conversion filter is selected by the turret 212 attached to the camera, and a pinhole pattern is selected by the turret 222, an image can be taken with the color-temperature conversion filter and the pinhole pattern.

As described above, when two or more turrets are provided, as many optical characteristics as the number of turrets can be selected and superimposed.

In the case where the turret 212 that functions as filters and the turret 222 that functions as transmission/shielding patterns are provided as described above, it is preferable to dispose the turret 212 on the subject side and the turret 222 on the camera side, when the turrets 212 and 222 are attached to the camera.

Figure 16A:
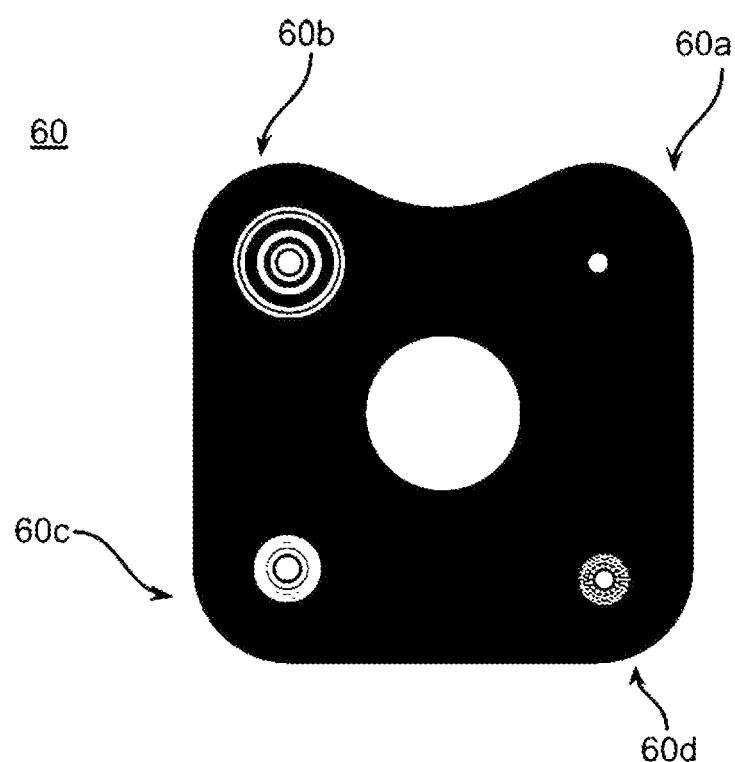
FIG. 16A is a plan view of an optical element part 60.
Figure 16B:
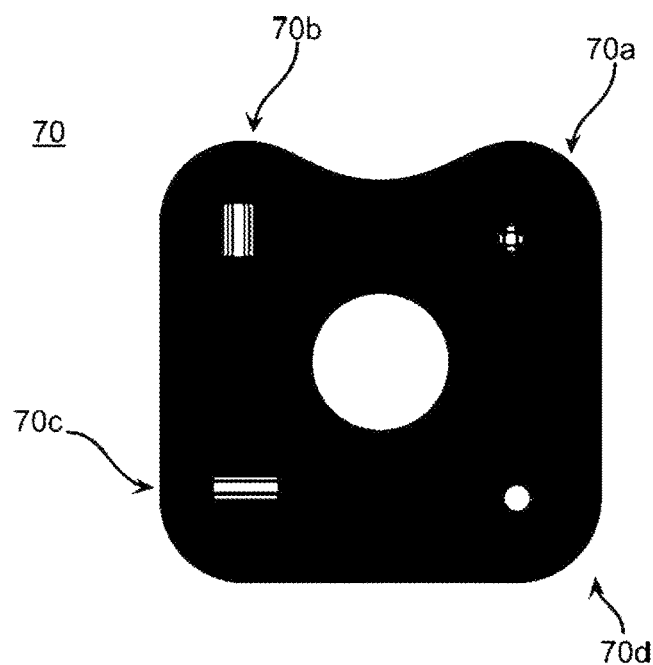
FIG. 16B is a plan view of an optical element part 70.

Next, an example of the transmission/shielding patterns applied to the optical element part 260 is described using FIGS. 16A and 16B. FIG. 16A is a plan view of an optical element part 60. FIG. 16B is a plan view of an optical element part 70. The optical element part 60 and the optical element part 70 are configured by forming two or more patterns different in characteristics from each other, the patterns being constituted of a transmission region that transmits incoming light and a shielding region that shields the light. In the examples of FIGS. 16A and 16B, optical characteristic regions 60*a*, 60*b*, 60*c*, and 60*d* of the optical element part 60 and optical characteristic regions 70*a*, 70*b*, 70*c*, and 70*d* of the optical element part 70 each have different optical characteristics. For example, each of the optical characteristic regions has at least one pattern out of a pinhole pattern, a zone plate pattern, and a photon sieve pattern.

In the optical element part 60 shown in FIG. 16A, there are formed a pinhole pattern with its center being on the optical axis of the camera optical system, a zone plate pattern having a plurality of concentric openings with their centers being on the optical axis of the camera optical system, and a photon sieve pattern with its center being on the optical axis of the camera optical system. In the optical characteristic region 60*a* of the optical element part 60, a pinhole pattern is formed. In the optical characteristic region 60*b* of the optical element part 60, a fractal zone plate pattern is formed. In the optical characteristic region 60*c* of the optical element part 60, a Fresnel zone plate pattern is formed. In the optical characteristic region 60*d* of the optical element part 60, a photon sieve pattern is formed.

In the optical characteristic regions 70*a*, 70*b*, and 70*c* of the optical element part 70 shown in FIG. 16B, zone plate patterns different in pattern from each other (for example, a two-dimensional orthogonal pattern, a one-dimensional vertical stripe pattern, and a one-dimensional horizontal stripe pattern, etc.) are formed. In the optical characteristic region 70*d* of the optical element part 70, a pinhole pattern is formed with its center being on the optical axis of the camera optical system.

The material of the optical element parts 60 and 70 is not particularly limited, and examples of the materials of the optical element parts 60 and 70 include resin sheets, and glass sheets, which are integrally molded products. In the respective regions of the optical element parts 60 and 70, patterns are configured by methods using silver salt photosensitive materials, methods using laser ablation, and methods using various printing to form the optical characteristic regions 60*a*, 60*b*, 60*c*, 60*d*, 70*a*, 70*b*, 70*c*, and 70*d*, and thereby the optical element parts 60 and 70 are formed.

In addition, one optical characteristic region of the optical element part may have two or more characteristics out of the optical characteristics possessed by the optical element. For example, a reddish color is printed on one region of the optical element part, and a pinhole pattern is further configured in the one region. This makes it possible to select two characteristics corresponding to the red color filter and the pinhole at the same time by rotating the turret and selecting the relevant optical characteristic region.

Figure 17A:
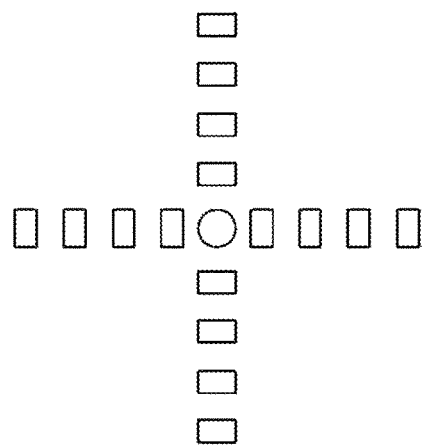
FIG. 17A is another example of patterns.
Figure 17B:
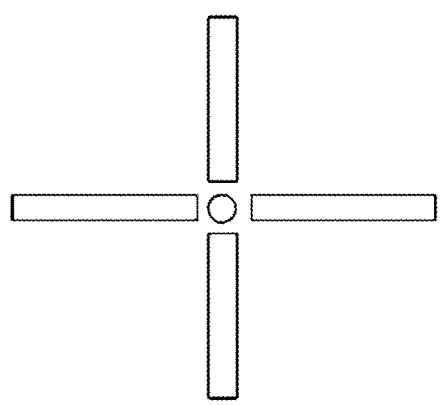
FIG. 17B is another example of the patterns.

Furthermore, the pinhole pattern is not limited to the circular pattern shown in the drawing. For example, star-shaped or polygonal patterns may also be used. A plurality of pinhole patterns may also be formed. For example, a plurality of pinhole patterns made of various shapes may be constituted as shown in FIGS. 17A and 17B.

Figure 18:
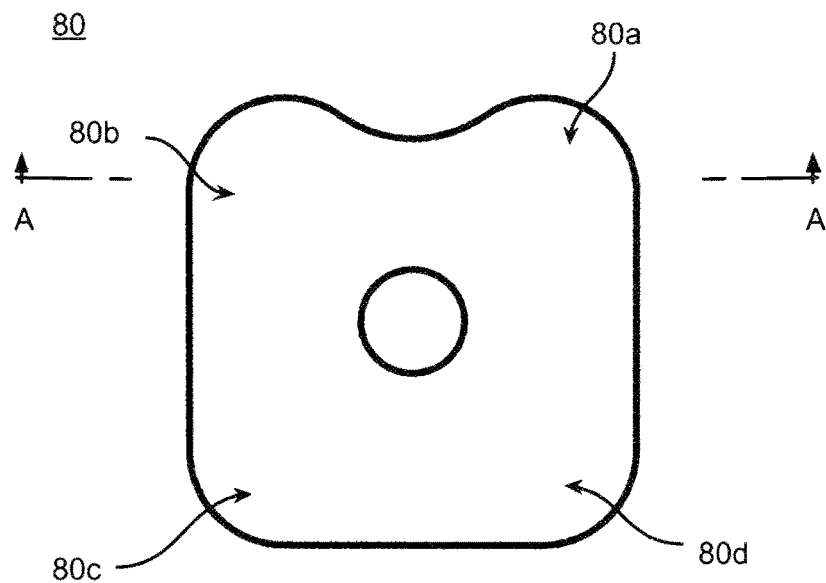
FIG. 18 is a plan view of an optical element part 80.
Figure 19:
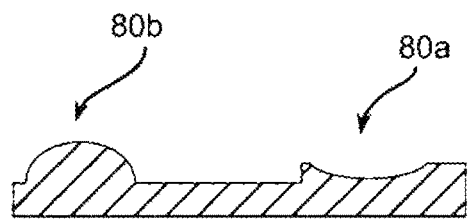
FIG. 19 is an A-A sectional view of FIG. 18.

Next, an example of the lenses applied to the optical element part 260 is described using FIGS. 18 and 19. FIG. 18 is a plan view of an optical element part 80. FIG. 19 is an A-A cross sectional view of FIG. 18. The optical element part 80 has respective optical characteristic regions 80a, 80b, 80c, and 80d, which are formed with two or more lenses different in characteristics from each other. In the example of FIGS. 18 and 19, the respective optical characteristic regions have optical characteristics different from each other. For example, a lens is integrally formed in each region of the optical element part 80 by injection molding. The materials of the optical element part 80 are not specifically limited, and examples of the materials include resin and glass with translucency. Examples of resin materials include acrylic resins such as polyethylene terephthalate (PET), polycarbonate, and polymethyl methacrylate (PMMA), cyclo-olefin polymer (COP), and cyclo-olefin copolymer (COC).

In the optical characteristic regions 80a, 80b, 80c, and 80d of the optical element part 80 shown in FIGS. 18 and 19, lenses different in type from each other are formed. In the example of FIG. 18, a flat convex lens is formed in the optical characteristic region 80b of the optical element part 80, and a flat concave lens is formed in the optical characteristic region 80a. The type of lenses to be formed is not particularly limited, and may include, in addition to the lenses shown in FIG. 19, biconcave lenses, biconvex lenses, convex meniscus lenses, and concave meniscus lenses.

As described in the foregoing, in the second embodiment, the turret-type optical element device 200 including two turrets has been described. The number of the turrets is not limited to two. The turret-type optical element device 200 may include only the turret 212 or the turret 222, or may have three or more turrets.

Third Embodiment

In the first embodiment and the second embodiment, the turret-type optical element device in which the optical element part itself is an integrally formed product that is configured to be detachable from the turret.

Figure 20:
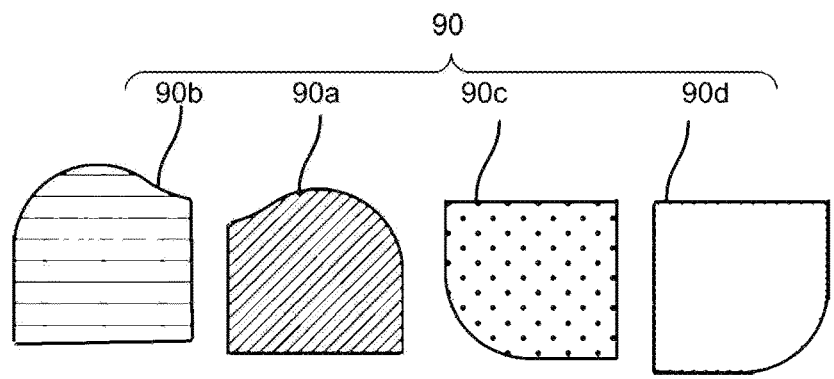
FIG. 20 is an explanatory view of an optical element part 90 according to a third embodiment.
Figure 21:
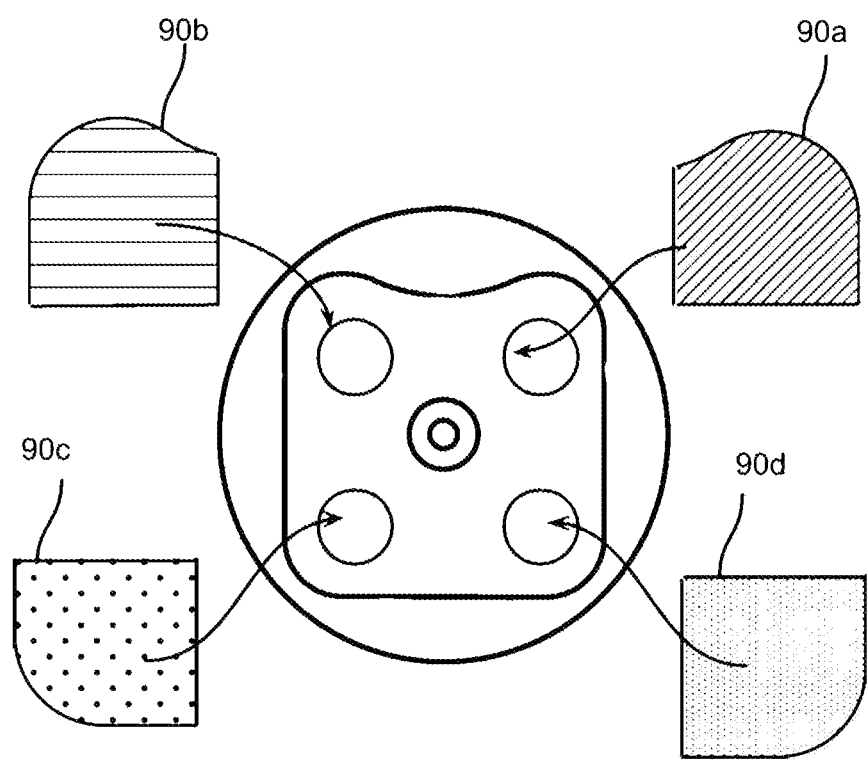
FIG. 21 is an explanatory view about fitting of optical characteristic members 90a to 90d.

In the third embodiment, the optical element part is constituted of two or more optical characteristic members. Since other configurational aspects are similar to those of the first and second embodiments, the description thereof is omitted. FIG. 20 is an explanatory view of an optical element part 90 according to the third embodiment. FIG. 21 is an explanatory view about fitting of optical characteristic members 90a to 90d.

A turret-type optical element device of the present embodiment is a turret-type optical element device used for a camera. The turret-type optical element device includes a turret provided rotatably with respect to a substrate having an optical path opening, the turret detachably attaching an optical element part 90. The optical element part 90 is constituted of two or more optical characteristic members 90a, 90b, 90c, and 90d different in characteristics from each other, out of the optical characteristic members 90a, 90b, 90c, and 90d having optical characteristic regions that have optical characteristics possessed by an optical element. The turret includes two or more openings and configured to allow the openings to face an optical path opening by rotating the turret. The turret includes a turret body having a recess in a shape corresponding to the respective optical characteristic members 90a, 90b, 90c, and 90d that constitute the optical element part 90, and an element pressing part that presses the optical element part, the element pressing part having two or more openings formed in shapes and positions substantially identical to those of the openings of the turret body when being attached to the turret body. When the optical element part 90 is attached to the turret, the optical characteristic members 90a, 90b, 90c, and 90d that constitute the optical element part 90 are each fitted to the recess of the turret body, and the element pressing part is further attached to the turret body.

The optical element part 90 is constituted of two or more optical characteristic members 90a, 90b, 90c, and 90d different in characteristics from each other. The recess of the turret body is formed with the shape corresponding to each of the optical characteristic members 90a, 90b, 90c, and 90d. When the optical element part 90 is attached to the turret, the optical characteristic members 90a, 90b, 90c, and 90d are fitted to the recess of the turret body as shown in FIG. 21, and the element pressing part (not shown) is further fitted and attached thereto. Since optical characteristics in the respective optical characteristic regions have been described in detail in the first and second embodiments, the explanation thereof is omitted.

Thus, the optical characteristic members 90a, 90b, 90c, and 90d are fitted to the recess of the turret body and pressed by the element pressing part for attachment. This makes it possible to easily disassemble the turret into the turret body and the element pressing part to stably fit and attach each of the optical characteristic members 90a, 90b, 90c, and 90d, and disassembling the turret into the turret body and the element pressing part allows easy replacement of each of the optical characteristic members 90a, 90b, 90c, and 90d by a single disassembly and replacement work.

Fourth Embodiment

In the first embodiment and the second embodiment, the turret-type optical element device in which the optical element part itself is an integrally formed product that is configured to be detachable from a turret has been described.

Figure 22:
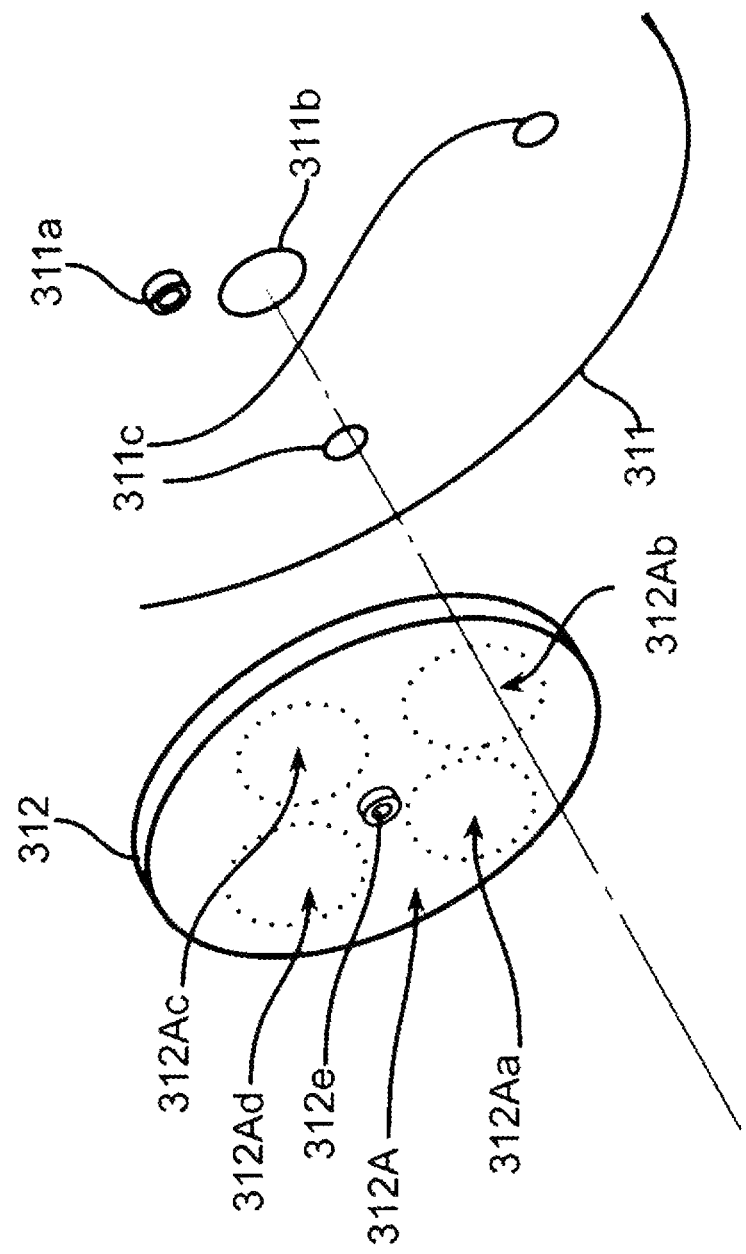
FIG. 22 is an appearance perspective view illustrating a turret 312 according to a fourth embodiment.

The fourth embodiment is an example of a turret-type optical element device in which the optical element part is constituted as an integrally formed product that is integrally formed with the turret. Since other configurational aspects are similar to those of other examples, detailed description thereof may be omitted. FIG. 22 is an appearance perspective view illustrating a turret 312 according to the fourth embodiment of the present invention.

A turret-type optical element device of the fourth embodiment is a turret-type optical element device used for a camera. The turret-type optical element device includes the turret 312 provided rotatably with respect to a substrate 311 having an optical path opening 311b. The turret 312 includes an optical element part 312A including two or more optical characteristic regions 312Aa, 312Ab, 312Ac, and 312Ad different in characteristics from each other, out of the optical characteristics possessed by an optical element. The turret 312 is configured to allow each of the optical characteristic regions 312Aa, 312Ab, 312Ac, and 312Ad to face the optical path opening 311b when the turret 312 is rotated. The optical element part 312A is an integrally formed product that is integrally formed with the turret 312.

In substantially the center of the turret 312, a hole 312e is formed. The turret 312 is supported, through a screw (not shown), to the hole 312e and a shaft 311a of the substrate 311 so as to be rotatable with respect to the substrate 311.

The materials of the turret 312 are not particularly limited, and examples of the materials include resin, glass, and metal. Examples of resin materials include acrylic resins such as polyethylene terephthalate (PET), polycarbonate, and polymethyl methacrylate (PMMA), cyclo-olefin polymer (COP), cyclo-olefin copolymer (COC), ABS resin, and vinyl chloride.

The turret 312, as shown in FIG. 22, includes the optical element part 312A. The optical element part 312A includes two or more optical characteristic regions 312Aa, 312Ab, 312Ac, and 312Ad different in characteristics from each other, out of the optical characteristics possessed by an optical element. In FIG. 22, the optical characteristic regions 312Aa, 312Ab, 312Ac, and 312Ad are shown by dotted lines. Since the optical characteristics in the respective optical characteristic regions have been described in detail in the first and second examples, the explanation thereof is omitted.

The optical characteristic regions 312Aa, 312Ab, 312Ac, and 312Ad of the optical element part 312A in the turret 312 are configured to be able to face the optical path opening 311b of the substrate 311 when the turret 312 is rotated. In FIG. 22, the optical characteristic region 312Ab faces the optical path opening 311b. In other words, FIG. 22 shows an example in the case where the optical characteristic region 312Ab is inserted into the optical path of the camera optical system shown by an alternate long and short dash line.

Since the optical element part 312A including two or more optical characteristic regions 312Aa, 312Ab, 312Ac, and 312Ad is integrally formed with the turret 312, two or more optical characteristics can be replaced by a single replacement of the turret 312.

According to the turret-type optical element device described in the foregoing, it is possible to implement the turret-type optical element device that allows replacement of two or more optical characteristics by a single replacement of the member or allows easy replacement of each optical characteristic member by a single disassembly and replacement work.

The turret-type optical element device can be applied as a lens that is replaceable with the lens that constitute a triplet lens, for example. The lens according to the turret-type optical element device may be used as a lens replaceable with any lens of the triplet lens, or the lens according to the turret-type optical element device may be used as the lenses replaceable with all the lenses of the triplet lens.

For example, when the central lens of the triplet lens is a replaceable lens, a subject-side lens is provided as a fixed lens on the subject side in the optical path of the camera optical system of the turret-type optical element device, that is, for example, at the optical path opening of the substrate. In addition, a camera-side lens is provided as another fixed lens at an attachment position located on the lensless camera where the turret-type optical element device is attached, or at a camera-side lens attachment portion (not shown) that is on the camera side in the optical path of the camera optical system of the turret-type optical element device. The turret-type optical element device as a central replaceable lens includes a turret having two or more lenses different in characteristics from each other in the optical characteristic regions.

In this way, the triplet lens is constituted of three lenses: the subject-side lens; the lens formed in the optical element part of the turret-type optical element device; and the camera-side lens. It is possible to implement the triplet lens that can change the central lens by rotating the turret.

In the case of applying the turret-type optical element device to the configuration of replacing the lenses on both the ends of a triplet lens, the central lens of the triplet lens may be fixed, while the lenses on both the ends may be constituted of the turret-type optical element devices. A combination of lenses in the triplet lens can easily be changed by using the replaceable lens according to the turret-type optical element device as the lenses constituting the triplet lens.

As for the optical characteristics, the filter regions have been described with reference to FIG. 4 and other drawings, the patterns have been described with reference to FIGS. 16A, 16B, 17A, 17B, and other drawings, and the lenses have been described with reference to FIG. 18 and other drawings. However, the optical characteristic regions may be configured with two or more of patterns, filter regions, or lenses formed therein.

The scope of the present invention is not limited to the embodiments disclosed. The present invention is widely applicable to an optical element part that including two or more optical characteristic regions that are integrally formed, a turret-type optical element device including a turret that includes the optical element part, and a camera including the turret-type optical element device and a lensless camera.

REFERENCE SIGNS LIST

100 . . . turret-type optical element device
11 . . . substrate
12 . . . turret
13 . . . turret body
13a, 13b, 13c, 13d . . . opening
13f . . . recess
14 . . . element pressing part
14a, 14b, 14c, 14d . . . opening
15 . . . camera attaching frame body
50 . . . optical element part
50a, 50b, 50c, 50d . . . optical characteristic region
200 . . . turret-type optical element device
211 . . . substrate
212 (222) . . . turret
213 (223) . . . turret body
213a, 213b, 213c, 213d (223a, 223b, 223c, 223d) . . . opening
213f (223f) . . . recess
214 (224) . . . element pressing part
214a, 214b, 214c, 214d (224a, 224b, 224c, 224d) . . . opening
215 . . . camera attaching part
250 (251, 252) . . . optical element part
250a, 250b, 250c, 250d (251a, 251b, 251c, 251d, 252a, 252b, 252c, 252d) . . . optical characteristic region
260 . . . optical element part
260a, 260b, 260c, 260d . . . optical characteristic region
60, 70, 80 . . . optical element part
60a, 60b, 60c, 60d, 70a, 70b, 70c, 70d, 80a, 80b, 80c, 80d . . . optical characteristic region
90 . . . optical element part
90a, 90b, 90c, 90d . . . optical characteristic member
311 . . . substrate
312 . . . turret
312A . . . optical element part
312Aa, 312Ab, 312Ac, 312Ad . . . optical characteristic region

The invention claimed is:

1. A turret-type optical element device, comprising:
an attaching part configured to be attached to a lensless camera including no optical elements on an optical path; and
a turret configured to be rotatably attached to a substrate having an optical path opening, and including an optical element part having at least two optical characteristic regions in which characteristics in optical characteristics possessed by an optical element are different from each other, wherein the turret is rotated such that each of the optical characteristic regions and the optical path opening are faced each other, the optical element part itself is an integrally formed product that is detachably attached to the turret, and the turret-type optical element device is configured to be attached to the lensless camera through the attaching part, and constitutes an imaging system that includes no optical elements, other than the optical element part of the turret, on the optical path.

2. The turret-type optical element device according to claim 1, wherein each of the at least two optical characteristic regions includes
at least two patterns having
characteristics different from each other, and
a transmission region that transmits incoming light and a shielding region that shields the light, or
at least two lenses having characteristics different from each other, or at least two of the patterns or the lenses.

3. The turret-type optical element device according to claim 1, wherein the turret further includes
a turret body having at least two openings and rotated such that each of the at least two openings and the optical path opening are faced each other, and
an element pressing part pressing the optical element part and having at least two openings formed in shapes and positions corresponding to the at least two openings of the turret body when being attached to the turret body, the optical element part is the integrally formed product wherein when being attached to the turret body, portions of the optical element part other than the at least two optical characteristic regions contact with a surface portion of the turret body other than the at least openings of the turret body and a portion of the element pressing part other than the at least two openings of the element pressing part, and the at least two optical characteristic regions are respectively arranged at positions corresponding to the at least two openings of the turret body and the at least two openings of the element pressing part, and the optical element part is attached to the turret body, and the element pressing part is attached to the turret body to cover the optical element part.

4. The turret-type optical element device according to claim 3, wherein the turret body has a recess in a shape corresponding to the optical element part, and when the optical element part is attached to the turret body, the optical element part is fitted to a bottom surface of the recess of the turret body such that the portions of the optical element part other than the at least two optical characteristic regions contact with the bottom surface of the recess.

5. The turret-type optical element device according to claim 2, wherein the patterns are pinhole patterns, zone plate patterns, or photon sieve patterns.

6. The turret-type optical element device according to claim 1, further comprising at least one another turret configured to be rotatably attached to the substrate, wherein the turret and the at least one another turret respectively include the optical element parts having the optical characteristic regions different from or identical to each other.

7. An optical element part comprising:

at least two optical characteristic regions in which characteristics in optical characteristics possessed by an optical element are different from each other, wherein the optical element part itself is an integrally formed product that is configured to be detachably attached to a turret-type optical element device attached to a lensless camera having no optical elements on an optical path.

8. A turret comprising:

the optical element part according to claim 7, wherein the turret is configured to be included in the turret-type optical element device attached to the lensless camera having no optical elements on the optical path.

9. A camera comprising:

the turret-type optical element device according to claim 1; and a lensless camera having no optical elements on an optical path.

* * * * *